(12) United States Patent
Haartsen

(10) Patent No.: US 8,554,153 B2
(45) Date of Patent: Oct. 8, 2013

(54) TRANSMIT POWER CONTROL IN A RANDOM ACCESS SCHEME

(75) Inventor: Jacobus Haartsen, Hardenberg (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 960 days.

(21) Appl. No.: 11/994,670

(22) PCT Filed: Jul. 5, 2006

(86) PCT No.: PCT/EP2006/063892
§ 371 (c)(1),
(2), (4) Date: Aug. 9, 2008

(87) PCT Pub. No.: WO2007/006701
PCT Pub. Date: Jan. 18, 2007

(65) Prior Publication Data
US 2008/0293366 A1    Nov. 27, 2008

Related U.S. Application Data

(60) Provisional application No. 60/698,800, filed on Jul. 13, 2005.

(30) Foreign Application Priority Data

Jul. 7, 2005   (EP) ..................... 05014756

(51) Int. Cl.
*H04B 1/00*     (2006.01)
*H04B 7/00*     (2006.01)

(52) U.S. Cl.
USPC ............ 455/69; 455/68; 455/510; 455/522

(58) Field of Classification Search
None
See application file for complete search history.

(56) References Cited

U.S. PATENT DOCUMENTS

| | | | | |
|---|---|---|---|---|
| 5,295,152 | A * | 3/1994 | Gudmundson et al. | 370/342 |
| 5,793,307 | A * | 8/1998 | Perreault et al. | 370/451 |
| 6,349,210 | B1 * | 2/2002 | Li | 455/450 |
| 6,400,695 | B1 * | 6/2002 | Chuah et al. | 370/310 |
| 6,594,247 | B2 * | 7/2003 | Perkins et al. | 370/341 |
| 6,606,313 | B1 * | 8/2003 | Dahlman et al. | 370/347 |

(Continued)

FOREIGN PATENT DOCUMENTS

WO   2005/034382 A    4/2005

OTHER PUBLICATIONS

PCT International Search Report, dated Oct. 24, 2006, in connection with International Application No. PCT/EP2006/063892.

(Continued)

*Primary Examiner* — Yuwen Pan
*Assistant Examiner* — Ayodeji Ayotunde
(74) *Attorney, Agent, or Firm* — Potomac Patent Group; Kenneth B. Leffler

(57) ABSTRACT

A method and control device for generating a transmit power level for a communication apparatus for operation in a wireless communication network having a network node. The control device comprises a controller adapted to generate a request message for requesting access to a communication channel, to be transmitted to the network node. The control device is also adapted to determine whether access to the communication channel has been granted in response to the request message. A transmit power control unit is adapted to generate a transmit power level for the communication apparatus in dependence of whether access to the communication channel has been granted.

23 Claims, 5 Drawing Sheets

(56) References Cited

U.S. PATENT DOCUMENTS

| | | | |
|---|---|---|---|
| 6,621,826 B1* | 9/2003 | Taketsugu | 370/437 |
| 2003/0223452 A1* | 12/2003 | Toskala et al. | 370/442 |
| 2003/0224775 A1* | 12/2003 | Suda et al. | 455/422.1 |
| 2004/0152481 A1* | 8/2004 | Georgeaux et al. | 455/522 |
| 2004/0264497 A1* | 12/2004 | Wang et al. | 370/465 |

OTHER PUBLICATIONS

Third Generation Partnership Project TS 25.214 Version 6.5.0 (Mar. 2005), 3rd Generation Partnership Project; Technical Specification Group Radio Access Network; Physical layer procedures (FDD), Release 6.

Third Generation Partnership Project TS 03.64 Version 8.12.0 (Apr. 2002), Release 1999, 3rd Generation Partnership Project; Technical Specification Group GSM/EDGE; Radio Access Network; General Packet Radio Service (GPRS); Overall description of the GPRS radio interface; Stage 2.

ANSI/IEEE Std 802.11, 1999 Edition (R2003) Part 11: Wireless LAN Medium Access Control (MAC) and Physical Layer (PHY) Specifications.

Mangold, S. et al., "Analysis of IEEE 802.11e for QoS support in Wireless LANs", IEEE Wireless Communications, Dec. 2003, pp. 40-50.

Third Generation Partnership Project TS 25.214 Version 5.10.0 (Dec. 2004) 3rd Generation Partnership Project; Technical Specification Group Radio Access Network; Physical layer procedures (FDD), Release 5.

* cited by examiner

TRANSMIT POWER CONTROL IN A RANDOM ACCESS SCCHEME

CROSS-REFERENCE TO RELATED APPLICATIONS

This application claims priority under 35 U.S.C. §119 to European Patent Application No. 05014756.0, filed Jul. 7, 2005, which is hereby incorporated herein by reference in its entirety. This application also claims the benefit of U.S. Provisional Application No. 60/698,800, filed Jul. 13, 2005, which is hereby incorporated herein by reference in its entirety.

TECHNICAL FIELD OF THE INVENTION

The present invention relates to a method and a control device for generating a transmit power level of a wireless communication apparatus for operation in a wireless communication system.

DESCRIPTION OF RELATED ART

Progress in radio and VLSI (Very Large Scale Integration) technology has fostered widespread use of radio communications in consumer applications. Portable devices, such as mobile terminals, can be produced having acceptable cost, size and power consumption due to large scale, inexpensive production of versatile chips having small size and low power consumption.

An element in any multi-user communication system is a medium access control (MAC) scheme. When several users make use of the same bearer medium, such as radio, that can support the exchange of information, a suitable access scheme may be designed to give each user access to the communication channel while minimizing interference and delay. If the number of users is small, a polling scheme can be used in which a central controller (such as a master in Bluetooth®) sequentially polls the units to check if they have information to send. If the offered traffic is low, polling may introduce overhead and may introduce unnecessary delay as users are polled that have no desire to access the channel.

In that case, a random access scheme may be more efficient. For example in cellular telephone systems, such as GSM, a random access channel (RACH) exists in the uplink (from terminal to base station). The RACH is a channel on which a terminal can send a request message to be allocated a dedicated traffic or communication channel by the base station. When two or more terminals send a request message simultaneously, a collision may occur at the base station receiver. A suitable contention resolution scheme has to be implemented to resolve such simultaneous access attempts.

A random back-off method may be used to avoid that two or more terminals repeatedly collide with each other. However this introduces extra delay (i.e. latency) in the access method.

A contention resolution scheme works effectively if signals received from slave units have similar signal strength when received. A wireless communication network employing a random access scheme may suffer from the near far effect, i.e. signals from a first communication apparatus being located closer to a network node, which operates as master unit, overshadow signals from a second communication apparatus being located farther away from the network node. In such situations, signals from the second communication apparatus may not be received by the network node at all, or be received only when all other units in a cell make no requests for a communication channel. This is a problem, because it may take a long time to establish a communication channel to a unit located at the border of the cell operated by the network node.

Another problem with transmissions according to a random access scheme is that when fixed transmit power levels are utilized the power resources may not be utilized effectively. This may particularly be a problem in a battery powered communication apparatus having limited power resources.

SUMMARY OF THE INVENTION

It is an object of the invention to provide an effective access scheme in a wireless communication network.

According to a first aspect, a method for generating a transmit power level for a communication apparatus for operation in a wireless communication network having a network node comprises: transmitting to the network node a first request message, for requesting access to a communication channel, using a first transmit power level by the communication apparatus; determining based on access information derived from received data whether an access collision occurred at the network node as a consequence of the first request message; and generating, based on the determination, a second transmit power level to be used for transmitting a second request message.

The step of generating may comprise setting the value of the second transmit power level equal to the value of the first transmit power level if it is determined from the access information that an access collision occurred at the network node.

The step of generating may comprise generating the second transmit power level based on the first transmit power level and a power adjustment, and applying the second transmit power level when the second request message for requesting access to the communication channel is transmitted.

The transmit power adjustment may be received from the network node.

The step of generating may comprise generating the second transmit power level by increasing the first transmit power level if it is determined from the access information that access collision did not occur at the network node, and that access to the communication channel was not granted; or decreasing the first transmit power level if it is determined from the access information that access collision did not occur at the network node, and that access to the communication channel was granted.

The step of decreasing may be carried out only if it is determined that the second transmit power level will be equal to or above a minimum transmit power level.

The step of increasing may be carried out only if it is determined that the second transmit power level will be equal to or below a maximum transmit power level.

The step of determining may comprise determining whether an acknowledgement message has been received in response to transmitting the request message.

The step of determining may comprise determining whether an access condition has been altered, which is an indication that an access collision occurred at the network node as a consequence of the first request message.

The step of determining whether an access condition has been altered may comprise determining whether the received data is received in a next beacon message received within a predetermined time period after a first beacon message has been received. The received data may be an indication of an altered access condition.

The step of determining may comprise determining, based on the received data of the next beacon message, whether the communication apparatus is allowed to transmit in an access window indicated by the received data. The access window may be an altered access condition.

The altered access condition may indicate that another communication apparatus has been granted access to a communication channel. The step of generating may comprise increasing the first transmit power level to generate the second transmit power level in response to the altered access condition.

According to a second aspect, a control device for generating a transmit power level for a communication apparatus for operation in a wireless communication network having a network node comprises a controller adapted to generate a request message for requesting access to a communication channel, to be transmitted to the network node using a first transmit power level. The controller is adapted to determine based on access information derived from received data whether an access collision occurred at the network node as a consequence of a first access message. The control device also comprises a transmit power control unit adapted to generate a second transmit power level for the communication apparatus in dependence of whether an access collision occurred at the network node. The second transmit power level is to be used for transmitting a second request message.

The transmit power control unit may be adapted to generate the second transmit power level based on the first transmit power level and a power adjustment. Also the transmit power control unit may be adapted to apply the second transmit power level when the second request message for requesting access to the communication channel should be transmitted.

The controller may be adapted to receive the transmit power adjustment from the network node.

The transmit power control unit may be adapted to generate the second transmit power level by increase the first transmit power level if access to the communication channel was not granted, or decrease the current transmit power level if access to the communication channel was granted.

The transmit power control unit may be adapted to determine whether the second transmit power level will be equal to or above a minimum transmit power level, and to only decrease the first transmit power level if the second transmit power level will be equal to or above a minimum transmit power level.

The transmit power control unit may be adapted to determine whether the second transmit power level will be equal to or below a maximum transmit power level, and to only increase the first transmit power level if the next transmit power level will be equal to or below a maximum transmit power level.

The controller may be adapted to determine whether an acknowledgement message has been received in response to transmitting the first request message.

The controller may also be adapted to determine whether an access condition has been altered.

Furthermore, the controller may be adapted to determine whether a next beacon message is received within a predetermined time period after a first beacon message has been received. The next beacon message may include the access information.

The controller may be adapted to determine, based on access information included in the next beacon message, whether the communication apparatus is allowed to transmit in an access window indicated by the next beacon message. The access information may include an altered access condition.

According to a third aspect, a transceiver unit comprises the control device.

According to a fourth aspect, a communication apparatus comprises the control device.

According to fifth aspect, a computer program product comprises computer program code means for executing the method for generating a transmit power level when the computer program code means are run by an electronic device having computer capabilities.

Further embodiments of the invention are defined in the dependent claims. It is an advantage of the invention in that it supports implementation of a fair access scheme in a wireless communication network.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Further objects, features and advantages of the invention will appear from the following detailed description of the invention, reference being made to the accompanying drawings, in which.

DETAILED DESCRIPTION OF EMBODIMENTS

Figure 1:
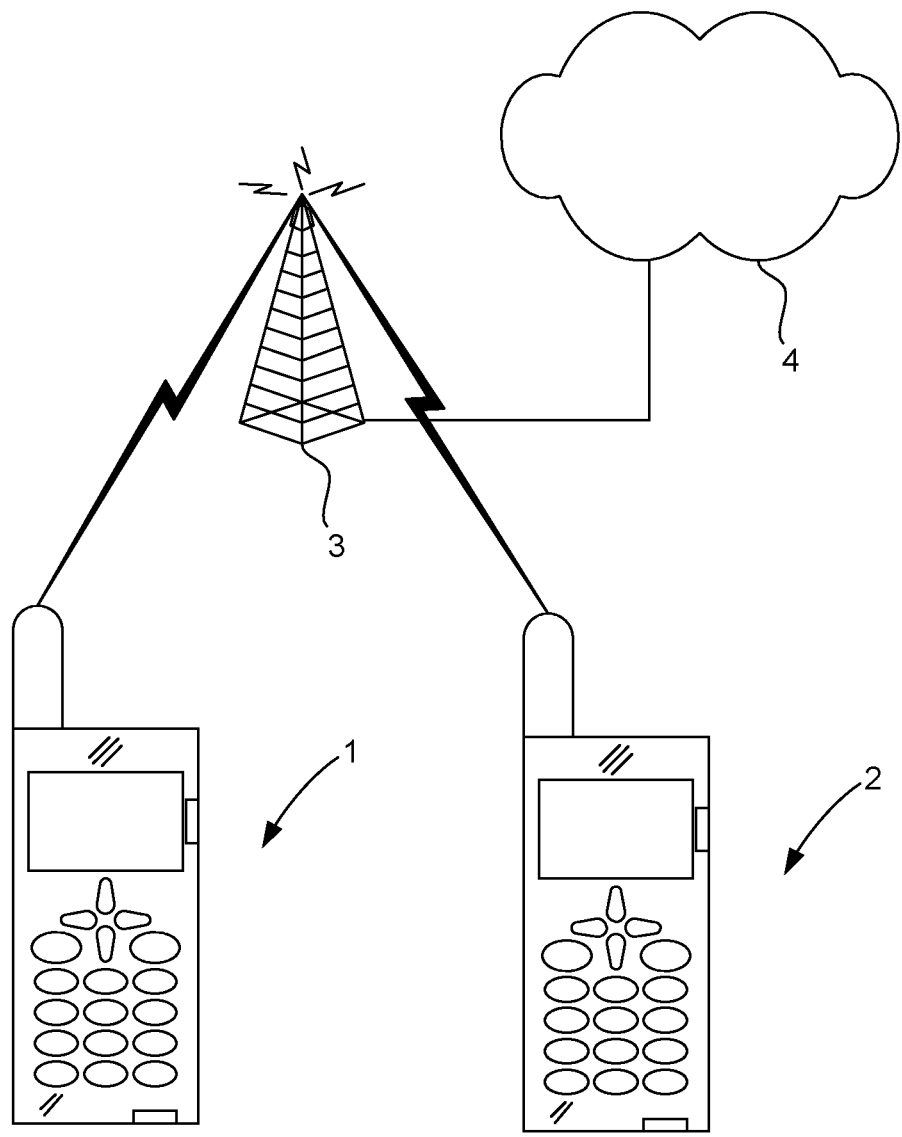
FIG. 1 is a schematic view of a first and a second communication apparatus and a communication network.

FIG. 1 illustrates a first and a second communication apparatus 1, 2 for operation in a wireless communication network. The communication apparatus 1 may be adapted to wirelessly communicate with one or several network nodes 3, such as a base station, in the wireless communication network. The communication apparatus 1, 2 may act as a slave unit. The network node 3 may act as a master unit. The wireless communication network may employ a random access scheme, such as is used in a GPRS, a Bluetooth®, or an IEEE 802.11, or a UMTS (Universal Mobile Telecommunication Standard) communication network. The network unit 3 may be connected to or be part of another communication network 4, such as a LAN (Local Area Network) or a WAN (Wide Area Network).

To achieve robustness in the communication network, the communication apparatus 1, 2 is adapted to apply a transmit power control scheme. A request message for a communication channel is transmitted using a first transmit power level. A second transmit power level to be used for transmitting a second request message for requesting access to a communication channel may be generated. The second transmit power level is generated in dependence of whether a collision between the first request message and another request message from a different communication apparatuses operating in the wireless communication network occurred at the network node 3 as a consequence of the first request message. In the communication apparatus 1, 2 it may be determined whether a collision occurred at the network node 3 based on access information derived from received data. The transmit power control scheme may be a scheme for controlling random access transmit power, i.e. the transmit power used for transmitting a random access message for requesting access to a random access network.

Any master unit in the network node may grant access to the communication channel. Network node 3, which may receive the request message from the communication apparatus 1, 2, may forward the request message to another network node in the communication network. The other network node may then act as the master unit and determine access to the communication channel.

Figure 2:
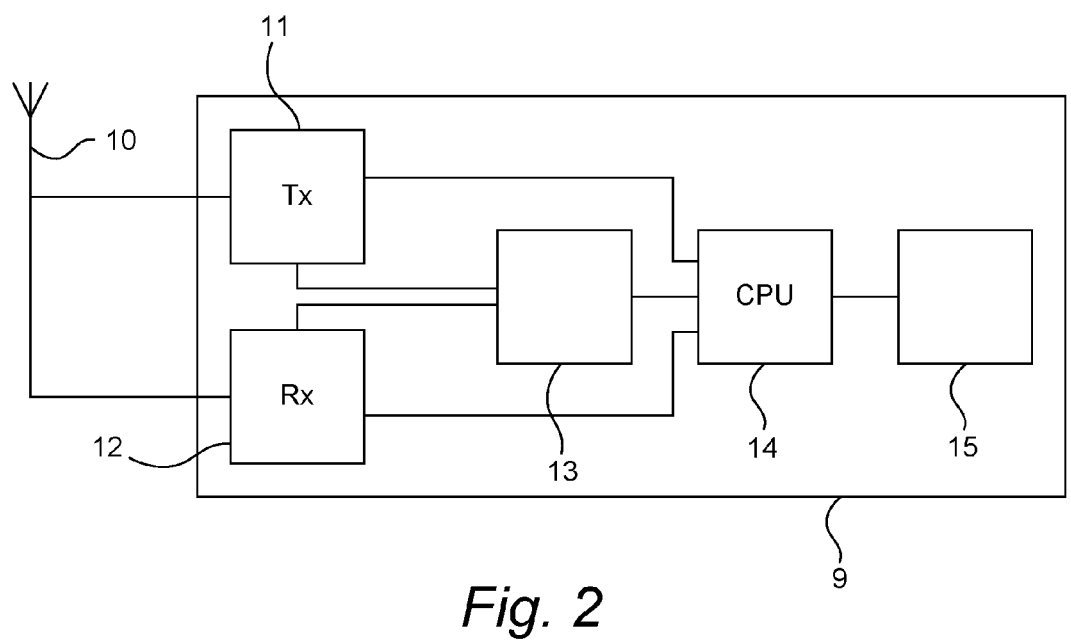
FIG. 2 is a block diagram of an embodiment of an wireless communication equipment including a transmit power control unit.

FIG. 2 illustrates an embodiment of a transceiver unit 9 of the communication apparatus 1, 2. Transceiver unit 9 comprises a transmitter (Tx) unit 11, a receiver (Rx) unit 12, a transmit power control unit 13, a controller 14, and a memory 15. Also, the transceiver unit 9 may be connected to an antenna 10 for receiving/transmitting signals from/to the network node 3. The transmit power control unit 13 together with the controller 14 may form a control device for controlling a transmit power level to be utilized by the transmitter unit 11.

The transmitter unit 11 may comprise various components for establishing a connection with and transmitting signals to the network node 3. Such components may include one or several filters, an up-converter for up-converting an IF signal to an RF signal, and/or a power amplifier, such as a variable gain amplifier, for amplifying a signal to be transmitted. The transmit power level to be used by the transmitter unit 11 may be established by the transmit power control unit 13, which may be connected to various components of the transmitter unit 11, e.g. the power amplifier.

The receiver unit 12 may comprise various components, such as one or several filters, a down-converter, and/or a discriminator for deriving data from a received and down-converted signal. The data may be supplied to the controller 14 for further processing.

The transmit power control unit 13 may be implemented by hardware, such as an ASIC (Application Specific Integrated Circuit) or an FPGA (Field Programmable Gate Array). Alternatively, the transmit power control unit 13 is implemented by software code portions to be run by a processor, such as a CPU (Central Processing Unit).

The controller 14 may be implemented by a processor, such as a CPU. The processor may run software code portions for carrying out the functions of the controller 14. Alternatively, the controller 14 is implemented by an ASIC or an FPGA. For example, the controller 14 may be adapted to generate the request message to be transmitted to the network node. Also, the controller 14 may be adapted to determine whether access to the communication channel has been granted. Controller 14 may implement the functions of the transmit power control unit 13.

The communication apparatus 1, 2 may comprise one or several memories, such as a RAM (Random Access Memory), a ROM (Read Only Memory), a flash memory, and/or a non-volatile memory, which are jointly illustrated by memory 15. Memory 15 may store software code portions for carrying out functions performed by other units of the electronic device 1, such as the controller 14 and/or the transmit power control unit 13.

When the communication apparatus 1, 2 is operating in the communication network, collisions may occur at the network node 3 if two or several requests for access to a communication channel are received from different communication apparatuses 1, 2 simultaneously at the network node 3. Also, errors may occur due to other factors, such as interference from other communication systems and/or noise, when the network node is receiving a request for a communication channel, wherein the access request might not be granted.

If the first communication apparatus 1 acting as a slave is much closer to the network node 3 acting as the master, or if the first communication apparatus 1 uses considerably more transmit power than the second communication apparatus 2 acting as a slave, first communication apparatus 1 may overshadow the transmissions of the second communication apparatus 2. That is, although there is some interference from the second communication apparatus 2, the carrier-to-interference ratio (C/I) at the network node 3 is sufficiently large such that the network node 3 can decode the message of the first communication apparatus 1 without errors. As a result, the network node 3 may grant access to the communication channel for the first communication apparatus 1, as it is not aware of the second communication apparatus 2 trying to get access. Therefore, the closest communication apparatus or the communication apparatus transmitting the strongest signals (the signals that are received with the largest RX level) is favoured above the communication apparatus being most remote or being the one that is transmitting the weakest signals. To provide robust access for all slave devices operating in the network, collisions of request messages may be detected. This can be accomplished if collisions result in errors at the receiver. Therefore, the contending signals should all be received approximately at the same power level at the receiver. This requires automatic transmit power control. The transmit power control should be such that the power received at the master (network node) should be approximately the same for signals received from all slave devices operating in the network.

The transmit power control may be relatively coarse. For example, in Bluetooth®, errors may occur when the interfering power is less than 8 dB below the desired power (C/I=8 dB). The accuracy of the transmit power control may e.g. be within 5-6 dB.

When it is desired to get access to a communication channel, a request message for requesting access to the communication channel may be transmitted from the communication apparatus 1, 2 to the network node 3. To achieve robustness in the system, the transmit power control scheme may be utilized during an access procedure. A request message for requesting access to a communication channel in the network may be transmitted to the network node 3, which may process the request itself or forward the request to any other network node. To transmit the request message, a first transmit power level may be used.

The transmit power control scheme may be implemented without any explicit feedback from the network node 3. The controller 14 may be adapted to determine whether access to the communication channel is granted by the network node 3 in response to the request message. Furthermore, the transmit power control unit 13 may be adapted to adjust the transmit power level to be utilized by the transmitter unit 11, e.g. for the transmission of a subsequent request message or for the transmission of data in response to having acquired access to the communication channel. A second transmit power level may be used to transmit the subsequent request message. The second transmit power level generated based on whether a collision occurred at the network node 3 due to the first request message. The determination may be made based on access information derived from received data, which is transmitted by the network node 3.

In an embodiment, the controller 14 may be adapted to determine whether access to the communication channel has been granted by the network node 3 by determining whether received data, which comprises an acknowledgement message as access information, has been received from the network node 3 in response to transmitting the request message. If an acknowledgement message has been received in response to transmitting the request message, the controller may inform the transmit power control unit 13 that the network node 3 granted access to the communication channel in response to the request message. Consequently, a collision did not occur due to a request message. Then, the transmit power control unit 13 may adjust the transmit power level to be used by the transmitter unit 11, e.g. by decreasing the transmit power level to be used for transmitting a subsequent request message. If an acknowledgement message was not received in response to transmitting the request message, e.g. within a predetermined time period, the controller 14 is adapted to determine whether the network node 3 detected a collision, i.e. whether the network node 3 detected two request messages at the same time.

According to an embodiment, if the network node 3 detects a collision between multiple request messages, the network node 3 alters an access condition in response to detecting the collision. The altered access condition is transmitted to the communication apparatus 1, 2. An access condition may be access information, based on which it may be determined whether a collision occurred at the network node 3. The altered access condition may be detected by the controller 14. The altered access condition may be an access condition provided by the network node 3 on an access channel. The access condition may be the length of an access window, in which a request message may be sent over the access channel. Alternatively or additionally, the access condition may be providing split access windows. A split access window may be an indication of a collision at the network node 3. The split window may be detected by the controller 14 and be an indication of altered access condition. The altered access condition may e.g. be transmitted in a separate message. Alternatively, the altered access condition is transmitted in another message, which may contain a flag indicating that it carries an altered access condition, e.g. a beacon signal or message.

By comparing a first access condition valid prior to transmitting a first request message, and a second access condition valid after transmitting the first request message, the controller 14 may determine if a collision occurred at the network node. The network node may alter an access condition in response to detecting a collision or an error. If the controller 14 determines that the first and the second access conditions are different, the network node 3 detected a collision. Therefore, the communication apparatus 1, 2 may not be granted access to the communication channel if the access condition has been altered. Thus, the controller 14 may inform the transmit power control unit 13 that the network node did not grant access to the communication channel and detected a collision. Then, the transmit power control unit 13 may generate the transmit power level to be used by the transmitter unit 11 in dependence of the determined collision and the non-granting of access to the communication channel. The value of the second transmit power level may be set to be equal to the transmit level used to transmit the first transmit power level, e.g. if it is determined from the access information that an access collision occurred at the network node 3. One advantage of this embodiment is that it takes both collisions of request messages at the network node 3 and overshadowing into consideration, wherein the access scheme becomes more effective.

According to an embodiment, the transmit power control unit 13 may be adapted to generate the transmit power level to be used by the transmitter unit 11. The second transmit power level may be generated based on the power level used for transmitting the first request message and a power adjustment. Then, the second power level may be applied by the transmit power control unit e.g. by outputting a power level signal to the transmitter unit 11. The second power level may be applied when a subsequent request message for requesting access to a communication channel should be transmitted. The value of the power adjustment may e.g. be stored in the memory 15 and be dependent on whether the network node 3 has granted access to a communication channel in response to a request message. The power adjustment may e.g. be a discrete value, such as $\Delta P$, where P is a power value.

In an embodiment, the controller 14 may be adapted to generate the transmit power level to be used by the transmitter unit 11 by generating a second power level for transmitting a second request message. If it is determined that a collision did not occur at the network node 3 due to the first request message but network node 3 did not grant access to the communication channel, the transmit power level may be increased. Then, the second transmit power level may be generated by increasing a first transmit power level, which was used for the transmission of the first request message. If it is determined that the network node 3 did grant access to the communication channel in response to the first request message, the transmit power level may be decreased. Then, the second transmit power level may be generated by decreasing the first transmit power level. The transmit power level may be increased/decreased by a power adjustment value $\Delta P$.

In an embodiment, conditional generation of the power level to be used by the transmitter unit 11 is provided by the transmit power control unit 13. The transmit power level may be limited to a minimum transmit power level, Pmin, and a maximum transmit power level, Pmax. Thus, the current transmit power level, which was used for transmitting a first request message, is only decreased if it is determined that a next transmit power level will be equal to or above Pmin. Similarly, the current transmit power level is only increased if it is determined that the next transmit power level will be equal to or below Pmax. The next transmit power level may be applied for transmitting a subsequent request message.

Figure 3:
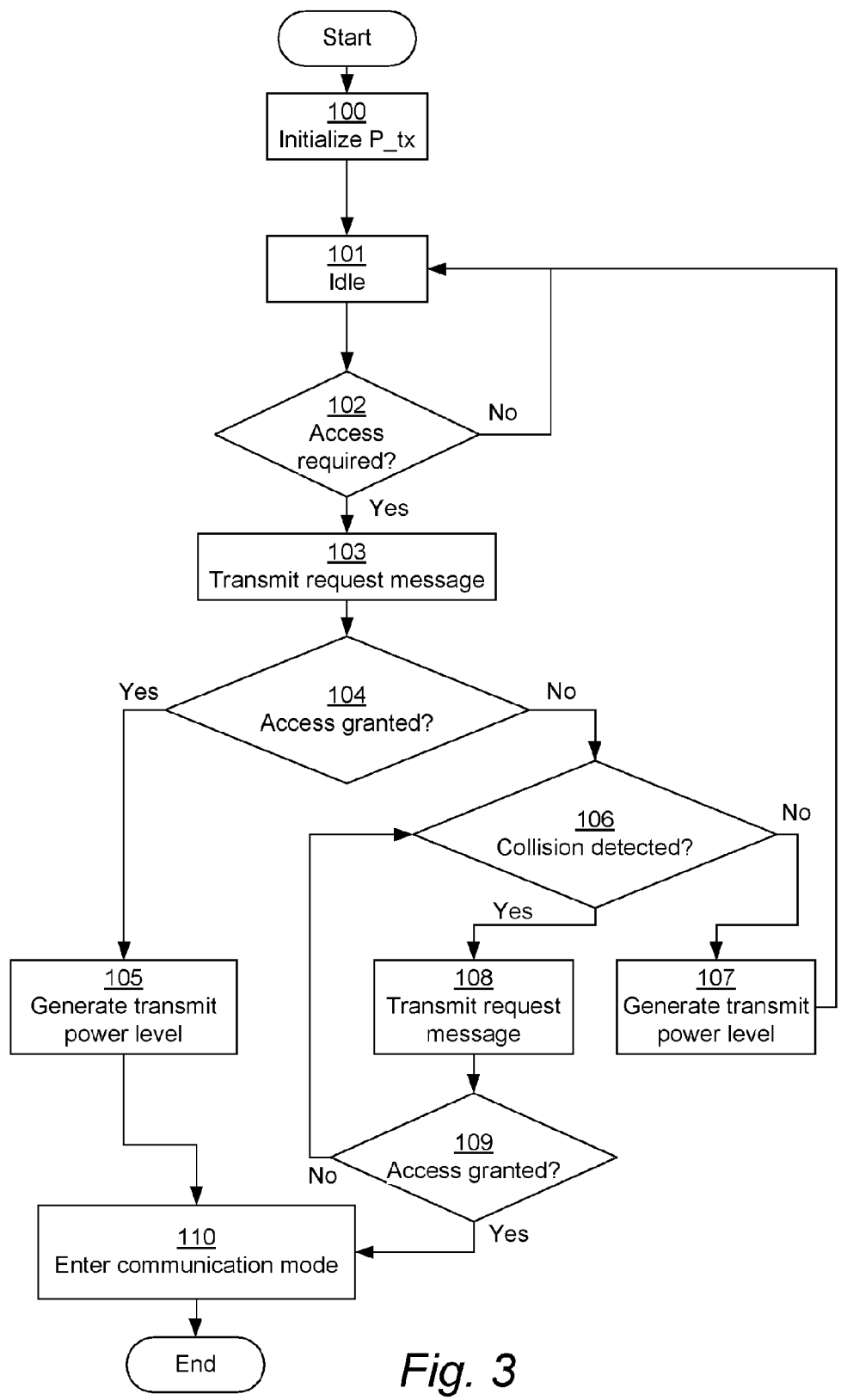
FIG. 3 is a flow-chart of an embodiment of the method for adjusting transmit power in a communication apparatus.

FIG. 3 illustrates an embodiment of a method for generating a transmit power level in a communication apparatus for operation with a random access scheme. In a first step 100, transmit power control unit 13 initializes the transmit power level, P_tx, by setting it to an initial transmit power level. Then, the communication apparatus 1, 2 may enter a sleep mode. In step 101, the communication apparatus 1, 2 may be idle. In the idle state, the communication apparatus 1 may wake up from a sleep mode and may listen for a beacon signal, e.g. at a predetermined beacon instant or for any other reason. However, if no beacon signal is transmitted, the communication apparatus 1 may remain idle until it is desired to access a communication channel. If a beacon signal is transmitted or for any other reason, e.g. in response to a channel request, it may be determined in step 102 whether it is desired to access a communication channel. If the answer in step 102 is no, the procedure may return to step 101. If the answer in step 102 is yes, the procedure proceeds to step 103, wherein the request message for requesting access to a communication channel may be transmitted over an access channel. In step 104, it is determined whether the network node 3 has granted access to the communication channel in response to the request message, e.g. by determining whether any acknowledgement message has been received within a predetermined time period, whether any acknowledgement message has not been received within a predetermined time period, or whether an access condition has been altered. If the answer in step 104 is yes, the procedure proceeds to step 105. In step 105, the transmit power level to be used by the transmitter unit 11 for transmitting a subsequent request message is generated. The new transmit power level may be generated e.g. by decreasing the transmit power level which was used for transmitting a previous request message. Alternatively, the transmit power level to be used is determined to be equal to the previously used transmit power level, e.g. if a minimum transmit power level has been reached. If the answer in step 104 is no, the procedure proceeds to step 106. In step 106 it is determined whether a collision was detected at the network node 3. The determination in step 106 may be based on access information derived from received data from the network node 3. The determination may e.g. be determined based on an access condition, or a collision indication. If the access condition has been altered, it may indicate a collision. A collision indication may e.g. be a separate message or a flag of another message, e.g. control information in a beacon signal. If the answer in step 106 is no, the procedure proceeds to step 107. In step 107, the transmit power level is generated, e.g. by increasing the transmit power level to be used by the transmitter 11 when transmitting a subsequent request message. From step 107, the procedure returns to step 101, wherein the communication apparatus 1 may be idle until the subsequent request message may be transmitted. If the answer in step 106 is yes, the procedure proceeds to step 108, wherein a request message for requesting access to the communication channel is transmitted. In step 109, it is determined whether the network node 3 has granted access to the communication channel, e.g. according to the same principles as was used in step 104. If the answer in step 109 is no, the procedure returns to step 106. If the answer in step 109 is yes, and from step 105, the procedure proceeds to step 110. In step 110, the communication apparatus enters a communication mode, in which communication with the network may commence.

The steps according to the embodiment of the method illustrated in FIG. 3 need not be carried out in the illustrated order. Furthermore, all steps illustrated need not be carried out in other embodiments.

FIGS. 4a-4d, and 5 illustrate an example for altering an access condition, which is altering the length of or opening new access windows. The example given in FIGS. 4a-4d may be utilized in a Bluetooth network, and may apply a fast method for contention resolution that can cope with a hidden node as well. A time slotted Bluetooth channel with slots of 625 μs may be used. Each communication apparatus 1, 2 in the network may be allocated an access number. The access number is unique for each communication apparatus 1, 2 and can be allocated by a master unit, such as the network node 3, at first connection setup. The access numbers may range from 0 to K−1, where K is the total number of slave devices. The master unit may send a beacon message 302 (FIG. 4a) at regular intervals T_beacon. Initially, two access windows (each e.g. 312.5 μs) may be provided just after the beacon message is sent in slot 310. The beacon message 302 may include an indication that units with an even access number may respond in a first access window 312 and units with an odd access number may respond in a second access window 314.

The request message sent by the slave unit may include its access number, e.g. in a header part of the request message. The request message may have the Bluetooth format with a preamble, and an FEC ((Forward Error Correction) coded header containing an address field, which includes the access number, and a header error check (HEC) code to detect errors.

Figure 4A:
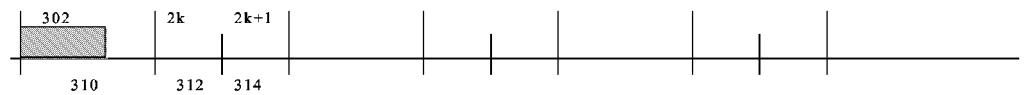
FIGS. 4*a*-4*d* are timing diagrams of an embodiment of a contention resolution scheme.
Figure 4B:
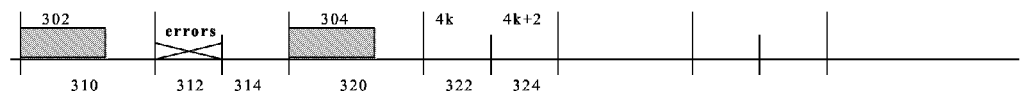

If the master experiences a signal in the first access window 312 but the reception fails due to errors (which may occur due to collisions) as shown in FIG. 4b, the master will directly send a next beacon message 304 in slot 320, as shown in FIG. 4b. Apparently, slaves with even access numbers are contending.

Figure 4C:
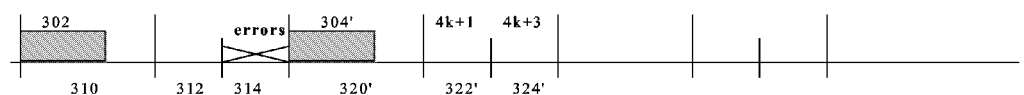
Figure 4D:
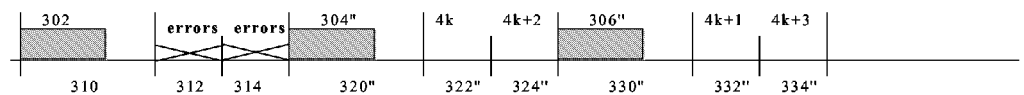

The access condition may be altered by sending the next beacon message within a predetermined time period. Thus, the next beacon message may comprise access information based on which collision determination may be made in the communication apparatus 1, 2. The next beacon message 304 may include a reference to two access windows 322 and 324 (e.g. 312.5 μs each) just after slot 320, in which the next beacon message 304 was sent. However, only the slaves with access numbers 4k (k=0, 1, 2, ... ) may respond in window 322, whereas units with access numbers 4k+2 must use window 324. In this way, the units with even access numbers have been split into two groups that contend independently in access windows 322 and 324. If the master experiences a signal in the second access window 314, the message in the next beacon message 304' will indicate that only the units with access numbers 4k+1 (k=0, 1, 2, ... ) may respond in access window 322' whereas units with access numbers 4k+3 must use window 324' (FIG. 4c). Thus, the number of units that is contending in the same access window is divided by two. If errors have been detected in both access window 312 and 314, two pairs of new windows may be provided (FIG. 4d). Beacon message 304" indicates two (even) access windows where slaves having access numbers 4k and 4k+2 can contend, respectively; beacon message 306" indicates two (odd) access windows where slaves having access numbers 4k+1 and 4k+3 can contend, respectively. This procedure of splitting windows when contention is experienced can be extended even further when further collisions are experienced. For example, if collisions are experienced in access window 322 allowing slaves with access numbers 4k to contend, a next beacon may provide two access windows for units with access numbers 8k and 8k+4, respectively.

Figure 5:
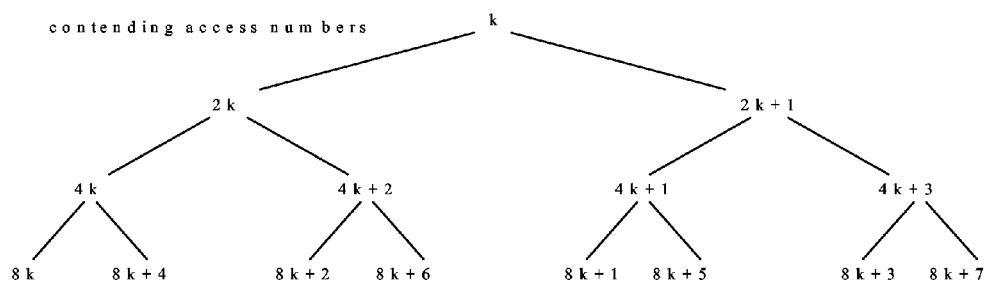
FIG. 5 is a schematic illustration of an embodiment of a contention resolution scheme.

The procedure can be generalized by using the tree construction as shown in FIG. 5. Initially, all slaves contend in a single access window. When collisions are experienced, the master will provide two new access windows, one window to be used by slaves having access numbers 2k (even numbers) and the other window to be used by slaves having access numbers 2k+1 (odd numbers). If the access window for the slaves having even access numbers still experience errors, two new access windows are opened, one access window for access numbers 4k, the other access window for access numbers 4k+2. If the access window for the slaves having odd access numbers still experience errors, two new windows are opened, one window for access numbers 4k+1, the other window for access numbers 4k+3, and so on. In general, errors detected in a window allowing slaves with access numbers I*K+J (with J=0, 1, 2, ... I−1) will result in two new access windows to be used by slaves having access numbers 2*I*K+J and 2*I*K+J+1, respectively.

New access windows may indicate an altered access condition. Consequently, new access windows may be an indication that a collision occurred at the network node 3 as a consequence of a request message.

Errors or collisions may be detected at the master receiver, which may provide additional access windows in response to detecting the errors or collisions. In cable and fibre media, collisions will always result in errors. This may not be the case in a radio or wireless environment. If one slave X is much closer to the master, or if it uses considerable more transmit power than the other slaves Yn, it will overshadow the transmissions of other slaves. That is, although there is some interference from slaves Yn, the carrier-to-interference ratio (C/I) at the master receiver is sufficiently large such that the master can decode the message of slave X without errors. As a result, the master will not open more access windows since it is not aware of other slaves trying to get access. Therefore, the closest or strongest slave (the one transmitting signals that is received with the largest RX level) will be favoured over the others. To keep a fair access for all the slave devices, collision is detected. This can be accomplished if collisions result in errors at the receiver. Therefore, the contending signals should approximately all be received at the same power level at the receiver. This may be provided by automatic transmit power control, which in turn may be provided by utilizing the method according to the invention. The transmit power control should be such that the power received at the master should be approximately the same for all slave devices. The transmit power control does not have to be very accurate. For example, in Bluetooth® errors may occur when the interfering power is less than 8 dB below the desired power (C/I=8 dB). So if the power control is accurate within e.g. 5-6 dB, the method works acceptable for Bluetooth®.

Figure 6:
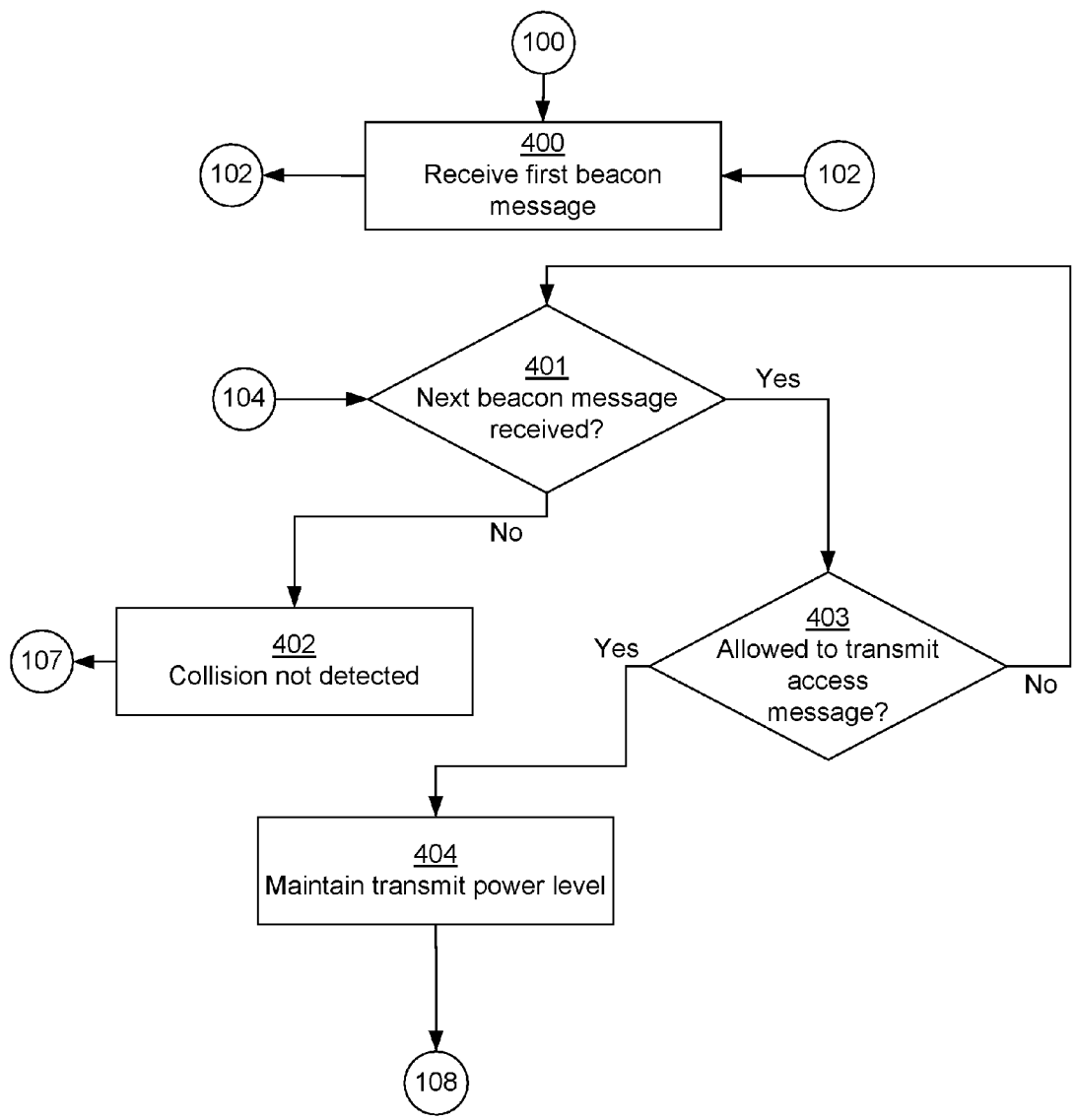
FIG. 6 is flow-chart of a method for adjusting transmit power in a communication apparatus.

FIG. 6 illustrates another embodiment for generating a transmit power level. The embodiment of FIG. 6 is a combination of some of the steps according to the embodiment of FIG. 3 and some additional steps. The procedure is started according to step 100 of FIG. 3 and proceeds to step 400. In step 400, a first beacon message is received. Then, the procedure proceeds to step 102 of FIG. 3. Steps 102-104 are carried out as described in relation to FIG. 3. If the answer in step 102 is no, the procedure returns to step 400. If the answer in step 104 is no, the procedure proceeds to step 401, i.e. steps 401-405 may be carried out as a subroutine in step 106. In step 401, it is determined whether a next beacon message has been received within a predetermined time period after having received the first beacon signal. The predetermined time period may depend on split of access windows and may be in the order of a few time slots. For example, if the error occurs in slot 312 or 314 (FIGS. 4b-4c) the predetermined time period is at least until beacon message 304 or 304' is received. Similarly, if the error occurs in time slots 312 and 314 as in FIG. 4d, the predetermined time period is at least until beacon message 306" is received. If it is determined in step 401 that a next beacon signal was not received within the predetermined time period, the procedure proceeds to step 402. The next beacon signal may be an indication of an altered access condition. In step 402 it is determined that no collision was detected as the next beacon signal was not received, wherein the procedure proceeds to step 107 of FIG. 3. Then, the procedure proceeds according to the steps of FIG. 3. If the answer in step 401 is yes, the procedure proceeds to step 403. In step 403 it is determined whether the communication apparatus 1 is allowed to transmit an access message. The determination in step 403 may be carried out by determining whether the next beacon message contained references to two access windows and an indication that the communication apparatus 1 is allowed to transmit in one of the access windows. The indication may be provided by access numbers. The access numbers may indicate the access number of one or several communication apparatuses that are allowed to transmit in a respective access window. Thus, the access number of the communication apparatus 1 may be compared to received access numbers. If the answer in step 403 is yes, the procedure proceeds to step 404. In step 404, the value of the transmit power level which was used to transmit a previous access message is maintained to be applied for transmitting a following access message, wherein the procedure proceeds to step 108. If the answer in step 403 is no, the procedure returns to step 401. If the procedure once again ends up in step 106, e.g. if the answer in step 109 is no, it will return to step 401.

In another embodiment, the communication apparatus 1, 2 is adapted for communication in a network supporting GPRS. When the communication apparatus 1, 2 is adapted for GPRS it applies transmit power control (TPC). According to prior art devices adapted for GPRS communication, TPC is not applied during the access request: the access burst is always sent at the maximum transmit power PMAX. This means that terminals close to the base stations have a power advantage and will have higher success of successful AB (Access Burst) delivery. Also, the power resources are not utilized effectively. With other words, a communication apparatus with favourable propagation conditions may get priority over a communication apparatus with less favourable propagation conditions. To achieve fairness in the system and prevent starvation of transmitting units at the cell edge, the transmit power control scheme according to the invention may be used during the access procedure in a communication apparatus adapted for GPRS communication. Thus, the communication apparatus 1, 2 may utilize its power resources more efficiently and the near far problem is solved. Further details can be found in "3GPP TS 03.64 V8.12.0 (2004-04), Release 1999, 3rd Generation Partnership Project; Technical Specification Group GSM/EDGE; Radio Access Network; General Packet Radio Service (GPRS); Overall description of the GPRS radio interface; Stage 2".

In still another embodiment, the communication apparatus 1, 2 may be adapted for communication in a WLAN network set up according to an IEEE 802.11 standard, such as IEEE 802.11a, 802.11b, or 802.11g. These versions differ only at the physical layer and are evolutions of the former IEEE 802.11 standard to provide higher data rates. The MAC layer of the IEEE 802.11 standard has been stable for a long time. Recently additions have been developed to improve security (IEEE 802.11i) and QoS (Quality of Service) (IEEE 802.11e).

In 802.11, a Distributed Coordination Function (DCF) has been specified, which allows units to access the communication channel in a contention-based fashion. A Carrier-Sense Multiple Access scheme combined with a Collision Avoidance (CSMA/CA) scheme may be used in order to prevent units to access the channel simultaneously, which would cause collisions and errors. When a communication apparatus wants to have access, it listens for the channel for a minimum of DIFS seconds, where DIFS (DCF Inter Frame Spacing) is a standardized guard time. If during this time, no other transmissions are heard, the communication apparatus starts to use the channel. However, when the channel is sensed to be busy, transmission is deferred. Instead, a backoff counter value is randomly selected between 0 and CW, where CW is the length of the contention window (CW). Initially, CW is set at a minimum value CWmin (i.e. 15). The communication apparatus then regularly listens to the channel to see if it is free. When it has been free for at least DIFS seconds, it starts to count down the backoff counter, one decrement per slot, where a slot is a standardized time duration (smaller than DIFS). As long as the channel is sensed free, the counter is decremented for every slot. When the counter reaches zero, the communication apparatus 1,2 starts using the channel. When during count down the channel is sensed to be busy again, the decrementing is suspended, the counter value is frozen, and the communication apparatus has to wait for another free time of DIFS seconds before it can continue to count down. Further details can be found in "Mangold S. et al., "Analysis of IEEE 802.11e for QoS support in Wireless LANs", IEEE Wireless Communications, December 2003, pp. 40-50".

The contention-based scheme described above for IEEE 802.11 is no guarantee for error-free communications. Units may choose the same random backoff value. Their counters may reach zero simultaneously and a collision may occur when both start to transmit. This will likely happen when CW is small and the number of units is large. Therefore, when a collision occurs (which may be detected by the communication apparatus 1, 2 if it does not receive an acknowledgment via an ARQ protocol, or receives a collision indication from the network node 3), the requesting communication apparatus 1, 2 may increase its CW value (e.g. by a factor of 2) and determine a new backoff value. For every new collision, the CW value may be increased until a maximum value is reached, CWmax. After a successful transmission, the CW value is reset to a minimum value CWmin.

The increase (doubling) of the contention window CW is based on the occurrence of errors (no ACK received/collision indication received). This may happen when two units transmit simultaneously. However, collisions do not always need to result in errors for both units. The success of reception of a packet depends on the Signal-to-Noise ratio experienced at the receiver. If signals from a first communication apparatus 1, 2 are received by the network node 3 at a much higher power level than signals from a second communication apparatus 3, the SNR of the strongest received packet of a signal may be sufficient for error free reception. This is also called the capture effect. In this case, the weakest received transmission will be in error, and only the source of that transmission will increase its contention window CW. If there is no power control (power control is not defined in the 802.11 standard), units with better propagation condition have priority above units with worse propagation conditions.

If errors or collisions occur, a communication apparatus 1, 2 adapted for communication according to WLAN IEEE 802.11 may be adapted to utilize the method according to the invention. Thus, the transmit power level may be generated based on whether collisions occur at the network node 3. The communication apparatus 1, 2 may first follow the normal contention-based techniques using the backoff counter. However, if the channel is used and a collision occurs, not only is the CW increased, but the transmit power may be increased. Conversely, when the channel access was successful, not only is the CW reset to CWmin (it could already be at this value), but the transmit power may be decreased as well.

The invention may also be used in UMTS. The specification 3GPP TS 25.214 V5.10.0 (2004-12) discloses transmit power control. If no grant is acknowledged in response to a request for a communication channel, the communication apparatus will increase its transmit power level according to said specification. However, as discussed above, it is not always advantageous to increase the transmit power even if grant is not acknowledged, e.g. when a collision occurs. Therefore, said specification could be amended according to the principles of the invention. Also for UMTS the transmit power level to be utilized may be determined based on whether collision occurred at the network node due to a first request message. If the network node detects collision, it may transmit access information indicating that a collision occurred. The access information may e.g. be a collision indication. The collision indication may e.g. be a flag of control information transmitted in a beacon signal. Alternatively, the collision indication may be transmitted in a separate collision indication message. If collision is detected, the transmit power level to be used for transmitting a second request message may be equal to the transmit power level used to transmit the first request message. Also, if it is detected from access information that another unit has been acknowledged access to the communication channel, it may be determined that a capturing effect occurred and the network node 3, which did not receive the first request message. Then, the transmit power level may be increased for the second request message.

The communication apparatus 1, 2 may be adapted for communication in various types of wireless networks employing a random access scheme, and is not limited by the network types given as examples above.

It is an advantage of the invention that power efficient transmissions in the communication apparatus may be provided. Also, access in the network becomes effective when the transmit power control is utilized.

The invention may be embedded in a computer program product, which enables implementation of the method and functions described herein. The invention may be carried out when the computer program product is loaded and run in a system having computer capabilities. Computer program, software program, program product, or software, in the present context mean any expression, in any programming language, code or notation, of a set of instructions intended to cause a system having processing capability to perform a particular function directly or after conversion to another language, code or notation.

The present invention has been described above with reference to specific embodiments. However, other embodiments than the above described are possible within the scope of the invention. Different method steps than those described above, performing the method by hardware or software, may be provided within the scope of the invention. The different features and steps of the invention may be combined in other combinations than those described. The scope of the invention is only limited by the appended patent claims.

The invention claimed is:

1. A method for generating a transmit power level for a communication apparatus for operation in a wireless communication network having a network node, comprising:

transmitting to said network node a first request message, for requesting access to a communication channel, using a first transmit power level by said communication apparatus;

the communication apparatus determining based on access information derived from received data whether an access collision occurred at said network node as a consequence of said first request message; and the communication apparatus generating, based on said determination, a second transmit power level to be used for transmitting a second request message, wherein the step of generating comprises setting the value of the second transmit power level equal to the value of the first transmit power level if it is determined from said access information that an access collision occurred at said network node, wherein the step of determining comprises using the access information to determine whether an access condition has been altered, and inferring from an access condition being altered that an access collision occurred at the network node as a consequence of said first request message.

2. The method according to claim 1, wherein the step of generating comprises:

generating the second transmit power level based on the first transmit power level and a power adjustment; and applying the second transmit power level when the second request message for requesting access to the communication channel is transmitted.

3. The method according to claim 2, comprising receiving the transmit power adjustment from the network node.

4. The method according to claim 1, wherein the step of generating comprises generating the second transmit power level by:
increasing the first transmit power level if it is determined from the access information that access collision did not occur at the network node, and that access to the communication channel was not granted.

5. The method according to claim 4, wherein the step of increasing is only carried out if it is determined that the second transmit power level will be equal to or below a maximum transmit power level.

6. The method according to claim 1, wherein the step of generating comprises generating the second transmit power level by:
decreasing the first transmit power level if it is determined from the access information that access collision did not occur at the network node, and that access to the communication channel was granted.

7. The method according to claim 6, wherein the step of decreasing is only carried out if it is determined that the second transmit power level will be equal to or above a minimum transmit power level.

8. The method according to claim 1, wherein the step of determining comprises determining whether an acknowledgement message has been received in response to transmitting the request message.

9. The method according to claim 1, wherein the step of determining whether an access condition has been altered comprises determining whether the received data is received in a next beacon message received within a predetermined time period after a first beacon message has been received, said next beacon message including said access information.

10. The method according to claim 9, wherein the step of determining comprises determining based on the received data of the next beacon message whether the communication apparatus is allowed to transmit in an access window indicated by said received data, which access window is an altered access condition.

11. The method according to claim 9, wherein the altered access condition indicates that another communication apparatus has been granted access to a communication channel; and wherein the step of generating comprises increasing the first transmit power level to generate the second transmit power level in response to said altered access condition.

12. A control device for generating a transmit power level for a communication apparatus for operation in a wireless communication network having a network node, comprising:
a controller of the communication apparatus adapted to generate a request message for requesting access to a communication channel, to be transmitted to said network node using a first transmit power level, and adapted to determine based on access information derived from received data whether an access collision occurred at said network node as a consequence of a first access message, wherein determining whether the access collision occurred comprises using the access information to determine whether an access condition has been altered, and inferring from an access condition being altered that an access collision occurred at the network node as a consequence of said first request message; and
a transmit power control unit of the communication apparatus adapted to generate a second transmit power level for said communication apparatus, which is to be used for transmitting a second request message, in dependence of whether an access collision occurred at the network node, wherein the transmit power control unit is adapted to:
generate the second transmit power level based on the first transmit power level and a power adjustment; and
apply the second transmit power level when the second request message for requesting access to the communication channel should be transmitted.

13. The control device according to claim 12, wherein the controller is adapted to receive the transmit power adjustment from the network node.

14. The control device according to claim 12, wherein the transmit power control unit is adapted to generate the second transmit power level by:
increasing the first transmit power level if access to the communication channel was not granted.

15. The control device according to claim 14, wherein the transmit power control unit is adapted to determine whether the second transmit power level will be equal to or below a maximum transmit power level, and to only increase the first transmit power level if the next transmit power level will be equal to or below a maximum transmit power level.

16. The control device according to claim 12, wherein the transmit power control unit is adapted to generate the second transmit power level by:
decreasing the current transmit power level if access to the communication channel was granted.

17. The control device according to claim 16, wherein the transmit power control unit is adapted to determine whether the second transmit power level will be equal to or above a minimum transmit power level, and to only decrease the first transmit power level if the second transmit power level will be equal to or above a minimum transmit power level.

18. The control device according to claim 12, wherein the controller is adapted to determine whether an acknowledgement message has been received in response to transmitting the first request message.

19. The control device according to claim 12, wherein the controller is adapted to determine whether a next beacon message is received within a predetermined time period after a first beacon message has been received, said next beacon message including said access information.

20. The control device according to claim 19, wherein the controller is adapted to determine based on access information included in the next beacon message whether the communication apparatus is allowed to transmit in an access window indicated by the next message; and wherein said access information includes an altered access condition.

21. The control device according to claim 12 wherein the control device is a functional component of a transceiver.

22. The control device according to claim 12 wherein the control device is a functional component of the communication apparatus.

23. A computer program product being stored on a non-transitory computer readable medium comprising computer program code means for executing a method when said computer program code means are run by an electronic device having computer capabilities, the method being for generating a transmit power level for a communication apparatus for operation in a wireless communication network having a network node, the method comprising:
transmitting to said network node a first request message, for requesting access to a communication channel, using a first transmit power level by said communication apparatus;

the communication apparatus determining based on access information derived from received data whether an access collision occurred at said network node as a consequence of said first request message; and the communication apparatus generating, based on said determination, a second transmit power level to be used for transmitting a second request message, wherein the step of generating comprises setting the value of the second transmit power level equal to the value of the first transmit power level if it is determined from said access information that an access collision occurred at said network node, wherein the step of determining comprises using the access information to determine whether an access condition has been altered, and inferring from an access condition being altered that an access collision occurred at the network node as a consequence of said first request message.

\* \* \* \* \*

UNITED STATES PATENT AND TRADEMARK OFFICE
CERTIFICATE OF CORRECTION

| | | |
|---|---|---|
| PATENT NO. | : 8,554,153 B2 | Page 1 of 1 |
| APPLICATION NO. | : 11/994670 | |
| DATED | : October 8, 2013 | |
| INVENTOR(S) | : Haartsen | |

It is certified that error appears in the above-identified patent and that said Letters Patent is hereby corrected as shown below:

In the Specification

In Column 9, Line 67, delete "((Forward" and insert -- (Forward --, therefor.

In Column 10, Line 58, delete "2*I*K+J+1," and insert -- 2*I*K+J+I, --, therefor.

Signed and Sealed this
Twenty-fourth Day of November, 2015

Michelle K. Lee
*Director of the United States Patent and Trademark Office*